(12) United States Patent
Fattal et al.

(10) Patent No.: US 12,189,168 B2
(45) Date of Patent: Jan. 7, 2025

(54) BACKLIGHT SCATTERING ELEMENT, MULTIVIEW DISPLAY, AND METHOD HAVING HIGH-INDEX LIGHT GUIDE LAYER

(71) Applicant: LEIA INC., Menlo Park, CA (US)

(72) Inventors: David A. Fattal, Menlo Park, CA (US); Ming Ma, Menlo Park, CA (US); Joseph D. Lowney, Menlo Park, CA (US)

(73) Assignee: LEAI INC., Menlo Park, CA (US)

( * ) Notice: Subject to any disclaimer, the term of this patent is extended or adjusted under 35 U.S.C. 154(b) by 8 days.

(21) Appl. No.: 17/674,776

(22) Filed: Feb. 17, 2022

(65) Prior Publication Data

US 2022/0171118 A1    Jun. 2, 2022

Related U.S. Application Data

(63) Continuation of application No. PCT/US2019/048055, filed on Aug. 25, 2019.

(51) Int. Cl.
   *F21V 8/00* (2006.01)
(52) U.S. Cl.
   CPC .................. *G02B 6/0055* (2013.01)
(58) Field of Classification Search
   CPC .... G02B 6/0055; G02B 30/33; G02B 5/1819; G02B 5/1866; G02B 27/425
   See application file for complete search history.

(56) References Cited

U.S. PATENT DOCUMENTS 9,128,226 B2  9/2015  Fattal et al.
9,201,270 B2  12/2015  Fattal et al.
(Continued)

FOREIGN PATENT DOCUMENTS

CA   3148752    3/2021
CN   114341549  4/2022
(Continued)

OTHER PUBLICATIONS

International Search Report and Written Opinion (ISRWO) by International Searching Authority (ISA) Korean Intellectual Property Office (KIPO) dated May 25, 2020 (11 pages) for foreign counterpart parent International Application No. PCT/US2019/048055.

(Continued)

*Primary Examiner* — Evan P Dzierzynski
*Assistant Examiner* — Jessica M Apenteng
(74) *Attorney, Agent, or Firm* — Schwegman Lundberg & Woessner, P.A.

(57) ABSTRACT

A backlight scattering element, multiview display, and method of backlight scattering element operation employ a high-index light guide layer in conjunction with a light guide and diffraction grating to provide emitted light. The backlight scattering element includes a light guide that guides light as guided light and a high-index light guide layer optically connected to the light guide and configured to extend a thickness of the light guide. The backlight scattering element also includes a diffraction grating adjacent to the high-index light guide layer to diffractively scatter out a portion of the guided light as emitted light. The multiview display includes a light guide having a first layer and a second layer, a refractive index of the second layer being greater than a refractive index of the first layer. The multiview display may modulate diffractively scattered out directional light beams to provide a multiview image.

19 Claims, 9 Drawing Sheets

(56) References Cited

U.S. PATENT DOCUMENTS

| | | | |
|---|---|---|---|
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 10,345,505 | B2 | 7/2019 | Fattal |
| 10,649,128 | B2 | 5/2020 | Fattal et al. |
| 10,712,501 | B2 | 7/2020 | Fattal |
| 10,798,371 | B2 | 10/2020 | Fattal |
| 10,830,939 | B2 | 11/2020 | Fattal et al. |
| 10,838,134 | B2 | 11/2020 | Fattal et al. |
| 10,884,175 | B2 | 1/2021 | Fattal |
| 10,928,677 | B2 | 2/2021 | Aieta et al. |
| 10,948,647 | B2 | 3/2021 | Fattal |
| 11,016,235 | B2 | 5/2021 | Fattal et al. |
| 11,200,855 | B2 | 12/2021 | Fattal |
| 11,204,457 | B2 | 12/2021 | Fattal et al. |
| 2009/0322986 | A1 | 12/2009 | Wei et al. |
| 2010/0207964 | A1* | 8/2010 | Kimmel ............ G02F 1/133615 313/111 |
| 2011/0170036 | A1* | 7/2011 | Ishikawa ............... G02B 6/0055 349/65 |
| 2012/0200807 | A1 | 8/2012 | Wei et al. |
| 2013/0169518 | A1 | 7/2013 | Wu et al. |
| 2014/0292758 | A1 | 10/2014 | Nam et al. |
| 2016/0327739 | A1* | 11/2016 | Nakamura ........... G03B 21/204 |
| 2017/0307800 | A1 | 10/2017 | Fattal |
| 2017/0363794 | A1 | 12/2017 | Wan et al. |
| 2019/0146221 | A1 | 5/2019 | Oku et al. |
| 2020/0301165 | A1 | 9/2020 | Fattal |
| 2021/0240005 | A1 | 8/2021 | Fattal et al. |

FOREIGN PATENT DOCUMENTS

| | | |
|---|---|---|
| EP | 4018123 | 6/2022 |
| GB | 0920333 | 1/2010 |
| JP | 2007087647 A | 4/2007 |
| JP | 2022512853 | 2/2022 |
| JP | 2022545710 | 10/2022 |
| JP | 7402971 | 12/2023 |
| KR | 20150021016 A | 2/2015 |
| KR | 20220042462 | 4/2022 |
| KR | 102675403 | 6/2024 |
| WO | 0179915 | 10/2001 |
| WO | 2012038856 A1 | 3/2012 |
| WO | 2018182991 | 10/2018 |
| WO | 2018208309 A1 | 11/2018 |
| WO | 2019125390 | 6/2019 |
| WO | 2021006915 A1 | 1/2021 |
| WO | 2021040683 | 3/2021 |
| WO | 2021050694 A1 | 3/2021 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

"Chinese Application Serial No. 201980099770.7, Office Action mailed Feb. 23, 2024", w English Translation, 23 pgs.

"Canadian Application Serial No. 3,148,752, Examiners Rule 86(2) Report mailed Mar. 7, 2023", 3 pgs.

"European Application Serial No. 19943339.2, Extended European Search Report mailed Mar. 24, 2023", 9 pgs.

"Korean Application Serial No. 10-2022-7007950, Response filed Jan. 30, 2024 to Notice of Preliminary Rejection mailed Oct. 23, 2023", W English Claims, 22 pgs.

"Canadian Application Serial No. 3,148,752, Voluntary Amendment filed Jan. 25, 2022", 36 pgs.

"Korean Application Serial No. 10-2022-7007950, Notice of Preliminary Rejection mailed Oct. 23, 2023", W English Translation, 14 pgs.

"Canadian Application Serial No. 3,148,752, Response filed Jun. 29, 2023 to Examiners Rule 86(2) Report mailed Mar. 7, 2023", 11 pgs.

"Japanese Application Serial No. 2022-512853, Notification of Reasons for Rejection mailed May 9, 2023", W English Translation, 6 pgs.

"European Application Serial No. 19943339.2, Response to Communication pursuant to Rules 161(2) and 162 EPC filed Sep. 8, 2022", 13 pgs.

"European Application Serial No. 19943339.2, Response filed Sep. 28, 2023 to Extended European Search Report mailed Mar. 24, 2023", 10 pgs.

"International Application Serial No. PCT US2019 048055, International Preliminary Report on Patentability mailed Mar. 10, 2022", 8 pgs.

"Chinese Application Serial No. 201980099770.7, Response filed Jun. 24, 2024 to Office Action mailed Feb. 23, 2024", w English Claims, 37 pgs.

* cited by examiner

BACKLIGHT SCATTERING ELEMENT, MULTIVIEW DISPLAY, AND METHOD HAVING HIGH-INDEX LIGHT GUIDE LAYER

CROSS-REFERENCE TO RELATED APPLICATIONS

This application is a continuation application of and claims priority to International Patent Application No. PCT/US2019/048055, filed Aug. 25, 2019, the entire contents of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a backlight scattering element with application to displays including a multiview display. The backlight scattering element includes a light guide and a high-index light guide layer that is optically connected to the light guide and that extends a thickness of the light guide, in some embodiments. The high-index light guide layer has a refractive index that is greater than a refractive index of the light guide. Further, the backlight scattering element includes a diffraction grating adjacent to the high-index light guide layer, the diffraction grating being configured to diffractively scatter out a portion of guided light from the light guide and high-index light guide layer as emitted light. The presence of the high-index light guide adjacent to the diffraction grating may increase a scattering efficiency of the backlight scattering element, in some embodiments. The backlight scattering element may be used in conjunction with in a two-dimensional (2D) display that provides a single broad-angle view as well as in a multiview display that has a plurality of different views with associated different view directions, according to various embodiments.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. Uses of directional backlighting and backlit displays described herein include, but are not limited to, mobile telephones (e.g., smart phones), watches, tablet computers, mobile computers (e.g., laptop computers), personal computers and computer monitors, automobile display consoles, cameras displays, and various other mobile as well as substantially non-mobile display applications and devices.

Figure 1A:
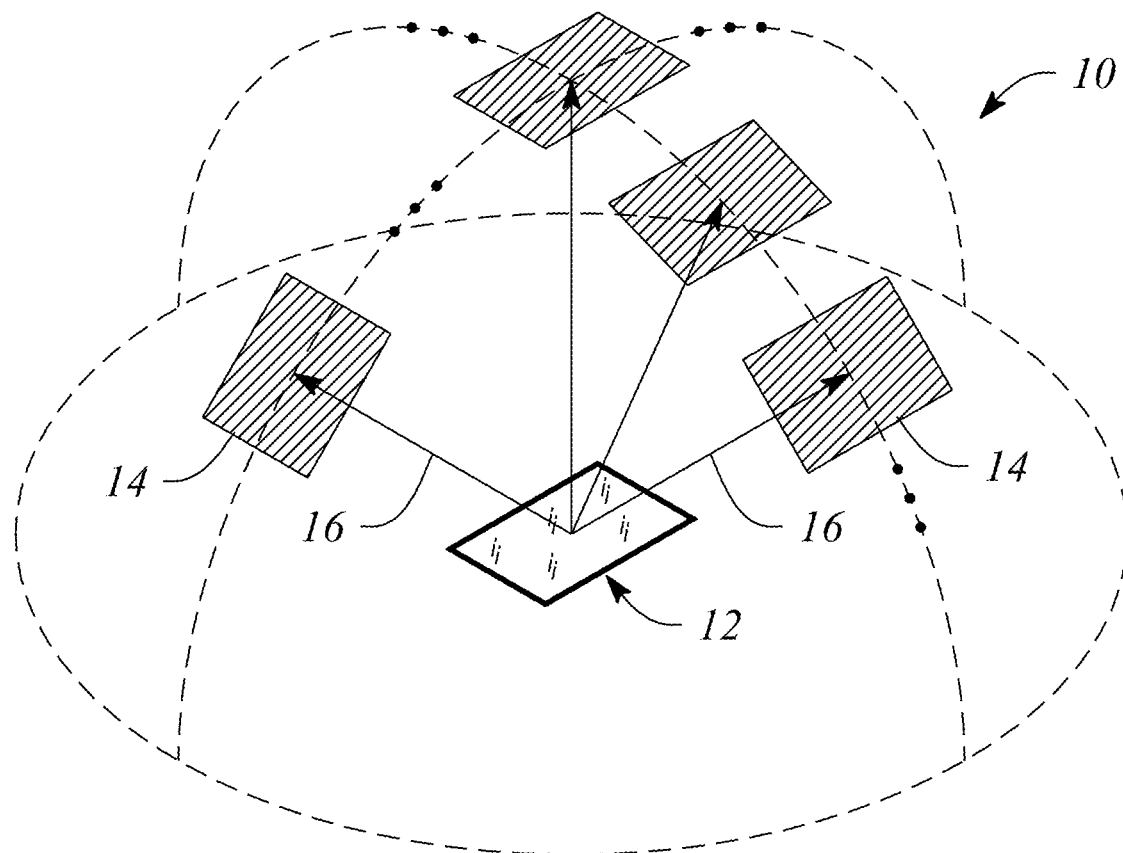
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 1B:
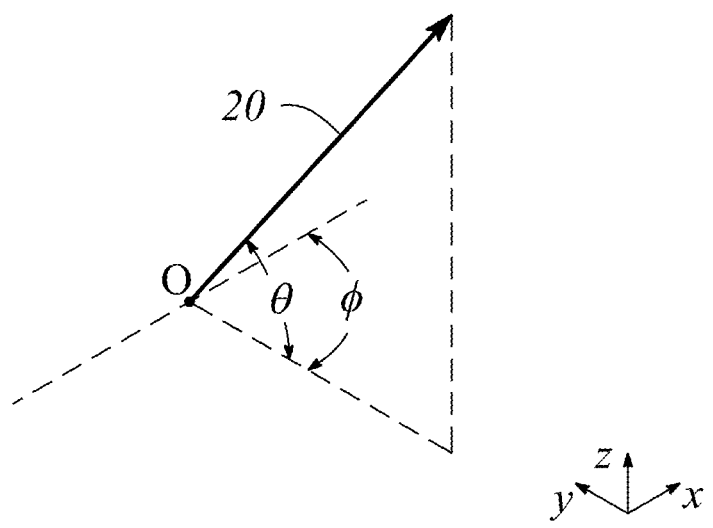
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction (i.e., a directional light beam) corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' may explicitly include more than two different views (i.e., a minimum of three views and generally more than three views), by some definitions herein. As such, 'multiview display' as employed herein may be explicitly distinguished from a stereoscopic display that includes only two different views to represent a scene or an image, according to some embodiments. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set or group of light valves of a light valve array that represent view pixels in each view of a plurality of different views of a multiview display. In particular, a multiview pixel may have an individual light valve of the light valve array corresponding to or representing a view pixel in each of the different views of the multiview image. Moreover, the view pixels provided by light valves of the multiview pixel are so-called 'directional pixels' in that each of the view pixels is associated with a predetermined view direction of a corresponding one of the different views, by definition herein. Further, according to various examples and embodiments, the different view pixels represented by the light valves of a multiview pixel may have equivalent or at least substantially similar locations or coordinates in each of the different views. For example, a first multiview pixel may have individual light valves corresponding to view pixels located at $\{x_1, y_1\}$ in each of the different views of a multiview image, while a second multiview pixel may have individual light valves corresponding to view pixels located at $\{x_2, y_2\}$ in each of the different views, and so on.

In some embodiments, a number of light valves in a multiview pixel may be equal to a number of different views of the multiview display. For example, the multiview pixel may provide sixty-four (64) light valves in association with a multiview display having 64 different views. In another example, the multiview display may provide an eight by four array of views (i.e., 32 views) and the multiview pixel may include thirty-two 32 light valves (i.e., one for each view). Additionally, each different light valve may provide a view pixel having an associated direction (e.g., light beam principal angular direction) that corresponds to a different one of the view directions of the different views, for example. Further, according to some embodiments, a number of multiview pixels of the multiview display may be substantially equal to a number of view pixels (i.e., pixels that make up a selected view) in a multiview image.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'diffraction grating' is broadly defined as a plurality of features (i.e., diffractive features) arranged to provide diffraction of light incident on the diffraction grating. In some examples, the plurality of features may be arranged in a periodic manner or a quasi-periodic manner. In other examples, the diffraction grating may be a mixed-period diffraction grating that includes a plurality of diffraction gratings, each diffraction grating of the plurality having a different periodic arrangement of features. Further, the diffraction grating may include a plurality of features (e.g., a plurality of grooves or ridges in a material surface) arranged in a one-dimensional (1D) array. Alternatively, the diffraction grating may comprise a two-dimensional (2D) array of features or an array of features that are defined in two dimensions. The diffraction grating may be a 2D array of bumps on or holes in a material surface, for example. In some examples, the diffraction grating may be substantially periodic in a first direction or dimension and substantially aperiodic (e.g., constant, random, etc.) in another direction across or along the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' or 'diffractive scattering' in that the diffraction grating may couple or scatter light out of the light guide by or using diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be below a top surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a plurality of diffraction gratings, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}$=1). In general, the diffraction order m is given by an integer (i.e., m=±1, ±2, . . . ). A diffraction angle On of a light beam produced by the diffraction grating may be given by equation (1). First-order diffraction or more specifically a first-order diffraction angle On is provided when the diffraction order m is equal to one (i.e., m=1).

Figure 2:
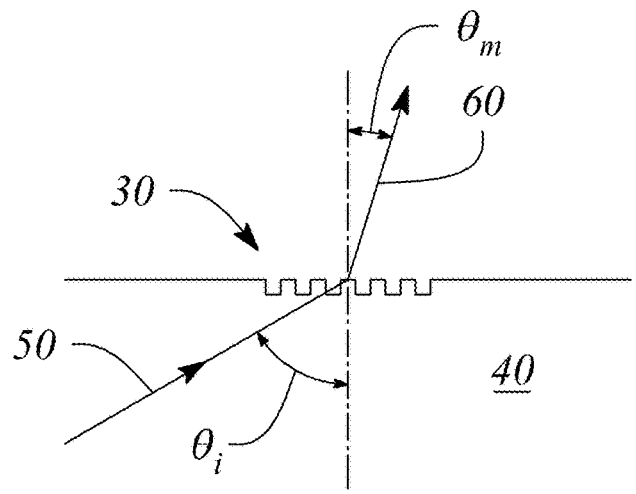
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The light beam 50 is a guided light beam within the light guide 40. Also illustrated in FIG. 2 is a directional light beam 60 diffractively produced and coupled-out or scattered-out by the diffraction grating 30 as a result of diffraction of the incident light beam 50. The directional light beam 60 has a diffraction angle On (or 'principal angular direction' herein) as given by equation (1). The directional light beam 60 may correspond to a diffraction order 'm' of the diffraction grating 30, for example.

Further, the diffractive features may be curved and may also have a predetermined orientation (e.g., a slant or a rotation) relative to a propagation direction of light, according to some embodiments. One or both of the curve of the diffractive features and the orientation of the diffractive features may be configured to control a direction of light coupled-out by the diffraction grating, for example. For example, a principal angular direction of the directional light may be a function of an angle of the diffractive feature at a point at which the light is incident on the diffraction grating relative to a propagation direction of the incident light.

By definition herein, a 'multibeam element' is a structure or element of a backlight or a display that produces light that includes a plurality of light beams. A 'diffractive' multibeam element is a multibeam element that produces the plurality of light beams by or using diffractive coupling, by definition. In particular, in some embodiments, the diffractive multibeam element may be optically coupled to a light guide of a backlight to provide the plurality of light beams by diffractively scattering out a portion of light guided in the light guide. Further, by definition herein, a diffractive multibeam element comprises a plurality of diffraction gratings within a boundary or extent of the multibeam element. The light beams of the plurality of light beams (or 'light beam plurality') produced by a multibeam element have different principal angular directions from one another, by definition herein. In particular, by definition, a light beam of the light beam plurality has a predetermined principal angular direction that is different from another light beam of the light beam plurality. As such, the light beams may be referred to as 'directional' light beams. According to various embodiments, the spacing or grating pitch of diffractive features in the diffraction gratings of the diffractive multibeam element may be sub-wavelength (i.e., less than a wavelength of the guided light).

While a multibeam element comprising diffraction gratings is used as an illustrative example in the discussion that follows, in some embodiments other components may be used in multibeam element, such as at least one of a micro-reflective element and a micro-refractive element. For example, the micro-reflective element may include a triangular-shaped mirror, a trapezoid-shaped mirror, a pyramid-shaped mirror, a rectangular-shaped mirror, a hemispherical-shaped mirror, a concave mirror and/or a convex mirror. In some embodiments, a micro-refractive element may include a triangular-shaped refractive element, a trapezoid-shaped refractive element, a pyramid-shaped refractive element, a rectangular-shaped refractive element, a hemispherical-shaped refractive element, a concave refractive element and/or a convex refractive element.

According to various embodiments, the directional light beam plurality produced by a multibeam element may represent a light field. For example, the directional light beam plurality may be confined to a substantially conical region of space or have a predetermined angular spread that includes the different principal angular directions of the light beams in the light beam plurality. As such, the predetermined angular spread of the directional light beams in combination (i.e., the directional light beam plurality) may represent the light field.

According to various embodiments, the different principal angular directions of the various light beams in the light beam plurality are determined by a characteristic including, but not limited to, a size (e.g., one or more of length, width, area, and etc.) of the diffractive multibeam element along with a 'grating pitch' or a diffractive feature spacing and an orientation of a diffraction grating within diffractive multibeam element. In some embodiments, the diffractive multibeam element may be considered an 'extended point light source', i.e., a plurality of point light sources distributed across an extent of the diffractive multibeam element, by definition herein. Further, a directional light beam produced by the diffractive multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, a diffraction grating, or various combinations thereof. Herein, a 'collimation factor,' denoted a, is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread may be an angle determined at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein, the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Herein, the term 'optically connected' is defined as a connection or interface that provide communication of an optical field across the connection or interface. As such, an optical connection may involve physical contact between a pair of layers or materials (e.g., a high-index light guide layer and a surface of another light guide or light guide layer). However, in other embodiments, the optical connection may not be or involve a physical contact between the pair of layers (e.g., layer of the pair may be separated by another material layer or an air gap). As such, 'optically connected' in these embodiments may involve optical signals propagating or extending across a gap or another material layer between the pair of layers as an evanescent optical field.

Further, as used herein, the article 'a' is intended to have its ordinary meaning in the patent arts, namely 'one or more'. For example, 'an element' means one or more elements and as such, 'the element' means 'the element(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
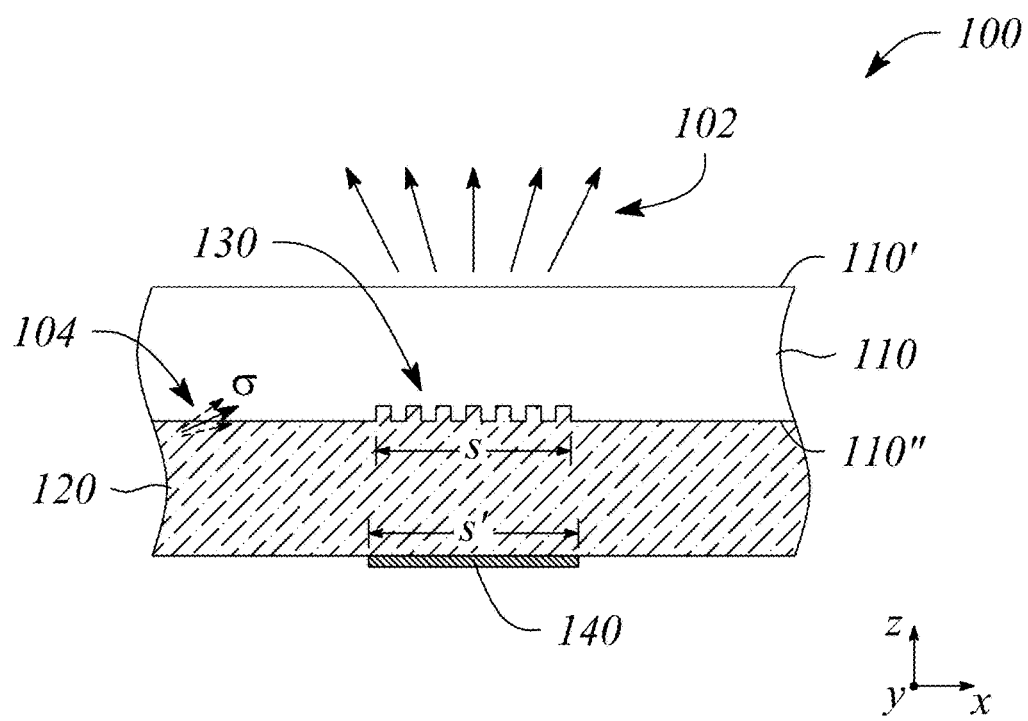
FIG. 3A illustrates a cross-sectional view of a backlight scattering element in an example, according to an embodiment consistent with the principles described herein.
Figure 3B:
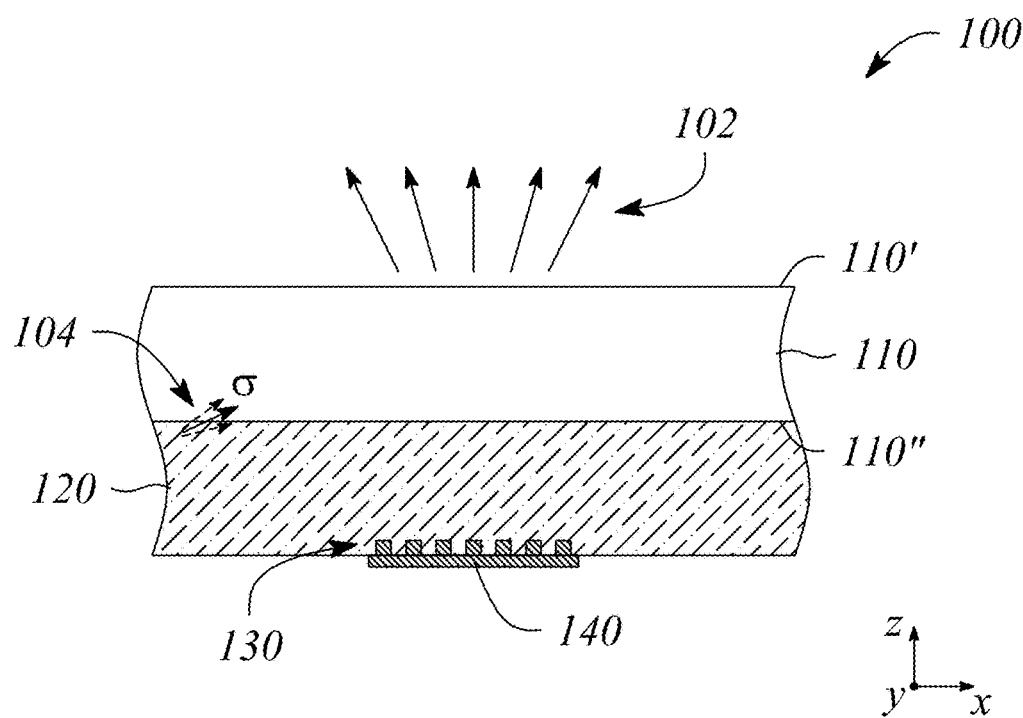
FIG. 3B illustrates a cross-sectional view of a backlight scattering element in an example, according to another embodiment consistent with the principles described herein.
Figure 3C:
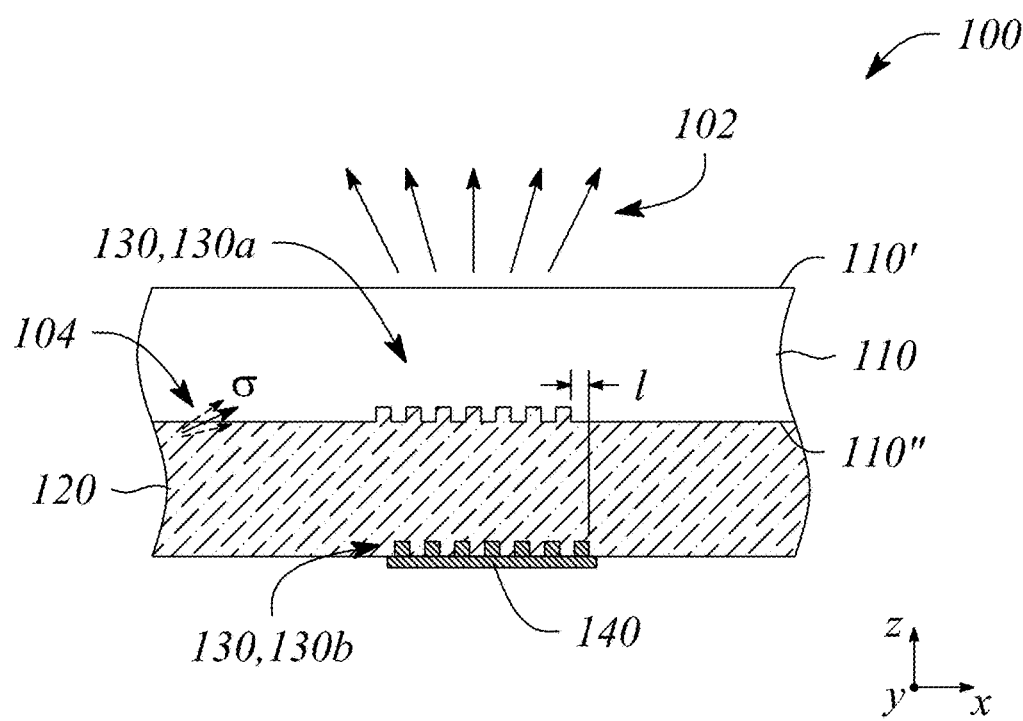
FIG. 3C illustrates a cross-sectional view of a backlight scattering element in an example, according to another embodiment consistent with the principles described herein.
Figure 3D:
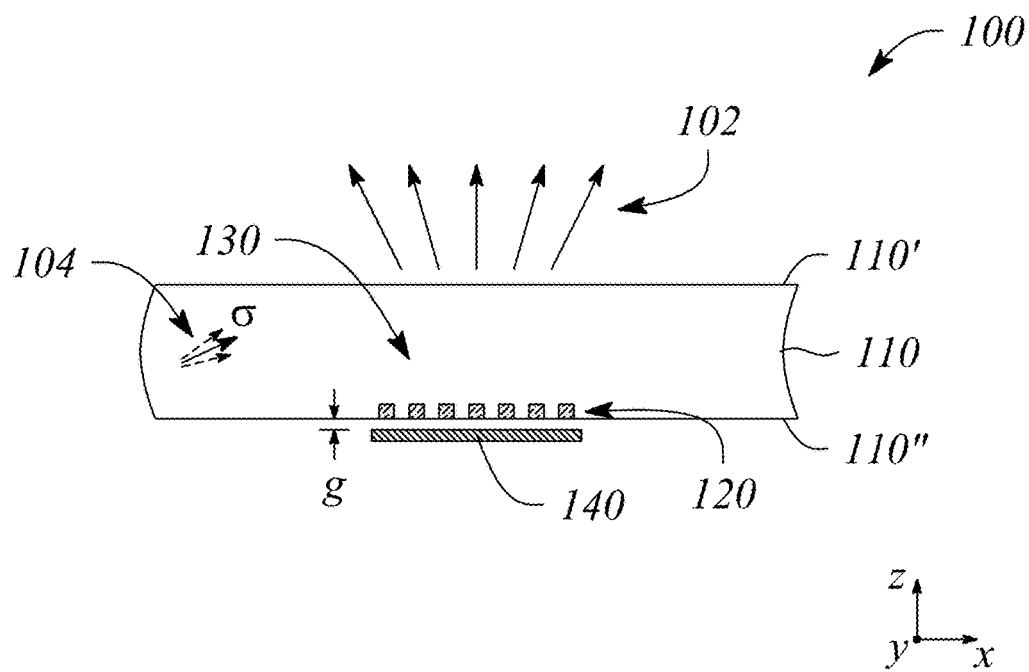
FIG. 3D illustrates a cross-sectional view of a backlight scattering element in an example, according to yet another embodiment consistent with the principles described herein.

According to some embodiments of the principles described herein, a backlight scattering element is provided. FIG. 3A illustrates a cross-sectional view of a backlight scattering element 100 in an example, according to an embodiment consistent with the principles described herein. FIG. 3B illustrates a cross-sectional view of a backlight scattering element 100 in an example, according to another embodiment consistent with the principles described herein. FIG. 3C illustrates a cross-sectional view of a backlight scattering element 100 in an example, according to another embodiment consistent with the principles described herein. FIG. 3D illustrates a cross-sectional view of a backlight scattering element 100 in an example, according to yet another embodiment consistent with the principles described herein. The backlight scattering element 100 is configured to provide emitted light 102, according to various embodiments.

As illustrated, the backlight scattering element 100 comprises a light guide 110. The light guide 110 is configured to guide light along a length of the light guide 110 as guided light 104 (i.e., a guided light beam 104). In particular, the light guide 110 comprises a material that is that is optically transparent or at least substantially optically transparent. In some embodiments, the light guide 110 may be a slab or plate (i.e., a plate light guide) comprising an extended, substantially planar sheet of the optically transparent material. According to various examples, the optically transparent material of the light guide 110 may comprise any of a variety of materials including, but not limited to, one or more of various types of glass (e.g., silica glass, alkali-aluminosilicate glass, borosilicate glass, etc.) as well as substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface of the light guide 110. The cladding layer may be used to further facilitate total internal reflection, according to some examples.

Further, according to some embodiments, the light guide 110 is configured to guide the guided light 104 according to total internal reflection at a non-zero propagation angle relative to a surface (e.g., a first surface 110' such as a 'front' or 'top' surface or side) of the light guide 110. In particular, the guided light 104 may propagate by reflecting or 'bouncing' between the first surface 110' and another guiding surface of the light guide 110 at the non-zero propagation angle. In some embodiments, a plurality of guided light beams comprising different colors of light may be guided by the light guide 110 as the guided light 104 at respective ones of different color-specific, non-zero propagation angles.

As defined herein, a 'non-zero propagation angle' is an angle relative to a surface (e.g., the first surface 110') of the light guide 110. Further, the non-zero propagation angle is both greater than zero and less than a critical angle of total internal reflection within the light guide 110, according to various embodiments. For example, the non-zero propagation angle of the guided light 104 may be between about ten degrees) (10°) and about fifty degrees (50°) or, in some examples, between about twenty degrees) (20°) and about forty degrees (40°), or between about twenty-five degrees (25°) and about thirty-five degrees (35°). For example, the non-zero propagation angle may be about thirty degrees (30°). In other examples, the non-zero propagation angle may be about 20°, or about 25°, or about 35°. Moreover, a specific non-zero propagation angle may be chosen (e.g., arbitrarily) for a particular implementation as long as the specific non-zero propagation angle is chosen to be less than the critical angle of total internal reflection within the light guide 110.

Further, the guided light 104, or equivalently the guided light beam 104, produced by coupling light into the light guide 110 may be a collimated light beam, according to some embodiments. Herein, a 'collimated light' or a 'collimated light beam' is generally defined as a beam of light in which rays of the light beam are substantially parallel to one another within the light beam (e.g., the guided light beam 104). Also, by definition herein, rays of light that diverge or are scattered from the collimated light beam are not considered to be part of the collimated light beam. In some embodiments (not illustrated) a collimator, such as a lens, a diffraction grating, a reflector or a mirror, as described above, (e.g., tilted collimating reflector) may collimate the light, e.g., from a light source. In some embodiments, the light source itself comprises a collimator. The collimated light provided to and guided by the light guide 110 as the guided light 104 may be a collimated guided light beam. In particular, the guided light 104 may be collimated according to or having a collimation factor σ, in various embodiments. Alternatively, the guided light 104 may be uncollimated, in other embodiments.

According to various embodiments, the backlight scattering element 100 illustrated in FIGS. 3A-3D further comprises a high-index light guide layer 120 that is optically connected to a surface of the light guide 110. For example, the high-index light guide layer 120 may be optically connected to a second surface 110" of the light guide 110 that is opposite to the first surface 110', e.g., as illustrated. In other embodiments, the high-index light guide layer 120 may be optically connected to the first surface 110' (e.g., see FIGS. 4A-4C, described below). In yet other embodiments, the high-index light guide layer 120 may be embedded within the light guide 110, e.g., as a layer sandwiched between portions or layers of the light guide 110. In each embodiment, the optical connection is at or provides an interface between the light guide 110 and the high-index light guide layer 120, by definition herein.

In some embodiments, the high-index light guide layer 120 is configured to extend or effectively extend a thickness of the light guide 110, e.g., as illustrated in FIGS. 3A-3C. That is, the guided light 104 is guided both within the light guide 110 and also within the high-index light guide layer 120 that is optically connected to the light guide 110 at the interface. Therefore, in some embodiments, the light guide 110 may be characterized as effectively comprising the high-index light guide layer 120.

As with the light guide 110, a material of the high-index light guide layer 120 is optically transparent or substantially optically transparent. According to various embodiments, a refractive index of the material of the high-index light guide layer 120 is greater than a refractive index of the material of the light guide 110. For example, an index of refraction of the light guide 110 may be in a range from about 1.4 to about 1.6 (e.g., 1.5), while the high-index light guide layer 120 may have an index of refraction between about 1.7 and about 2.5.

As illustrated in FIGS. 3A-3D, the backlight scattering element 100 further comprises a diffraction grating 130 adjacent to the high-index light guide layer 120. The diffraction grating 130 is configured to diffractively scatter out a portion of the guided light 104 as the emitted light 102. For example, as illustrated in FIG. 3A, the diffraction grating 130 may include diffractive features defined in the second surface 110" of the light guide 110 (e.g., the diffractive feature may be grooves in or ridges on the second surface 110"). As illustrated in FIG. 3A by way of example and not limitation, the diffractive features may be filled with material of the high-index light guide layer 120 or include the high-index light guide material between the diffractive features to provide the diffraction grating 130.

According to various embodiments, the emitted light 102 may comprise directional light beams, for example a plurality of directional light beams. In some embodiments, the directional light beams of the emitted light 102 have directions corresponding to a view in a two-dimensional (2D) display. For example, the directional light beams may be substantially co-directed to provide a single view representing a 2D image that is displayed on the 2D display. While co-directed, the directional light beams corresponding to the 2D display view may have a broad-angular spread to facilitate viewing the 2D image from a range of angles relative to the 2D display, for example. In other embodiments (e.g., described below with reference to FIGS. 7A-8), the directional light beams of the emitted light 102 may have a plurality of different directions representing different principal angular directions corresponding to different views or equivalently different view directions of a multiview display used to display a multiview image. For example, arrows illustrating the emitted light 102 in FIGS. 3A-3D may represent a plurality of directional light beams having five (5) different principal angular directions corresponding to 5 different views or view directions of a multiview display or a multiview image.

In some embodiments, the backlight scattering element 100 may further include a reflector or reflective island 140. The reflector or reflective island 140 may be aligned with and have an extent corresponding to an extent of the diffraction grating 130, according to some embodiments. In some embodiments, a size s' of the reflective island 140 may be equal to or somewhat greater than a size s of the diffraction grating 130, as illustrated. For example, the reflective island size may be between about five percent (5%) and about thirty percent (30%) greater than the size s of the diffraction grating 130. In other examples, the reflective island size may be about two percent (2%), about ten percent (10%), about fifteen percent (15%), about twenty percent (20%), or about twenty-five percent (25%) greater than the size s of the diffraction grating 130.

According to various embodiments, the reflective island 140 comprises a reflective material or material layer that is configured to reflect light diffractively scattered by the diffraction grating 130 in a direction corresponding to a direction of the emitted light 102. That is, diffractively scattered light directed toward the reflective island 140 is reflectively redirected by the reflective island 140 and thus may add to or augment light diffractively scattered in the direction of the emitted light 102 by diffraction grating 130. As a result, the diffraction grating 130 and reflective island 140, in combination, may represent a reflection mode diffraction grating, according to various embodiments. According to various embodiments, the reflective material of the reflective island 140 may comprise substantially any reflective material including, but not limited to, a reflective metal (e.g., aluminum, silver, gold, etc.) or a reflective polymer (e.g., an aluminum polymer composite) as well as various reflective films, e.g., an enhanced specular reflector (ESR) film such as Vikuiti™ ESR manufactured by 3M corporation, St. Paul, Minnesota.

In some embodiments, the high-index light guide layer 120 may be between the reflective island 140 and the light guide 110. In these embodiments, the diffraction grating 130 may be located one or both of (a) at an interface between the high-index light guide layer 120 and the light guide 110, and (b) between the high-index light guide layer 120 and the reflective island 140. For example, FIG. 3A illustrates the high-index light guide layer 120 located between the reflective island 140 and the light guide 110 with the diffraction grating 130 at the interface between the high-index light guide layer 120 and the light guide 110. Further, the reflective island 140 is adjacent to a side of the high-index light guide layer 120 opposite to the interface, as illustrated in FIG. 3A.

In FIG. 3B, the high-index light guide layer 120 is between the diffraction grating 130 and the light guide 110, as illustrated. Further in FIG. 3B, the reflective island 140 is located adjacent to the diffraction grating 130 at a surface of the high-index light guide layer 120 that is opposite to the interface between the light guide 110 and the high-index light guide layer 120. In some embodiments, the reflective material of the reflective island 140 may be a conformal layer that extends into and thus substantially covers or fills diffractive features (e.g., covers ridges or fills grooves) that provide the diffraction grating 130. For example, FIG. 3B illustrates reflective material (e.g., a metal or an aluminum polymer composite) as a conformal layer filling grooves in the high-index light guide layer 120 that serve as the diffractive features of the diffraction grating 130.

According to some embodiments, the diffraction grating 130 may comprise a plurality of diffraction gratings. In particular, as illustrated in FIG. 3C, the diffraction grating 130 may comprise a first diffraction grating 130a and a second diffraction grating 130b. The first diffraction grating 130a may be located at an interface between the high-index light guide layer 120 and the light guide 110, while the second diffraction grating 130b may be located at a surface of the high-index light guide layer 120 opposite to the interface, for example. A thickness of the high-index light guide layer 120 or equivalently a spacing between the first and second diffraction gratings 130a, 130b may be up to about ten microns (10 μm). In some embodiments, the high-index light guide layer thickness may be between about ten nanometers (10 nm) and about five microns (5 μm). In some embodiments, the high-index light guide layer thickness may be between about fifty nanometers (50 nm) and about one micron (1 μm). In yet other embodiments, the thickness may be between about one hundred nanometers (100 nm) and about five hundred nanometers (500 nm) or more, in some embodiments. For example, the spacing may be about two hundred nanometers (200 nm). In some embodiments, the spacing or thickness is related to a size of a pixel (e.g., a view pixel). For example, a bigger pixel may accommodate a bigger spacing or high-index light guide layer thickness between the first and second diffraction gratings 130a, 130b. In some embodiments, the spacing or high-index light guide layer thickness may be about one half of a size of the pixel. Further, the plurality of diffraction gratings may include more than two diffraction gratings (not illustrated), in some embodiments.

In some of these embodiments, diffraction gratings of the diffraction grating plurality may be laterally offset, displaced or shifted relative to one another. For example, the first diffraction grating 130a may have a lateral offset (i.e., be shifted laterally) from the second diffraction grating 130b. In some embodiments, the lateral offset may be greater than a spacing between diffractive features of the first and second diffraction gratings 130a, 130b. For example, FIG. 3C illustrates the first diffraction grating 130a having a lateral offset l from the second diffraction grating 130b, where the lateral offset l is greater than the diffractive feature spacing. In other embodiments, the lateral offset l between the first and second diffraction gratings 130a, 130b may be less than the diffractive feature spacing, while in yet other examples the first and second diffraction gratings 130a, 130b may be aligned with on another, i.e., the lateral offset l may be substantially zero (l≈0). The lateral offset l between first and second diffraction gratings 130a, 130b may be configured to adjust, control, or even optimize a diffractive scattering efficiency of the backlight scattering element 100, according to some embodiments.

The reflective island 140, described above, may be employed in conjunction with the diffraction grating 130 comprising the first and second diffraction gratings 130a, 130b. For example, FIG. 3C illustrates the reflective island 140 adjacent to the second diffraction grating 130b on a surface of the high-index light guide layer 120. In some embodiments, the diffractive scattering efficiency of the backlight scattering element 100 may be increased both by the presence of the reflective island 140 and by the lateral offset l.

FIG. 3D illustrates yet another embodiment of the backlight scattering element 100 comprising the light guide 110, the high-index light guide layer 120, the diffraction grating 130, and the reflective island 140. However, in FIG. 3D, the high-index light guide layer 120 is substantially confined to be within the diffractive features of the diffraction grating 130. For example, a thickness of the high-index light guide layer 120 may reduced to such an extent that material of the high-index light guide layer 120 remains only in grooves or voids in the light guide 110 that form the diffraction grating 130. FIG. 3D also illustrates, by way of example and not limitation, the reflective island 140 being separated from the light guide 110 by a gap g. For example, the gap g may be an air gap or may be filled with optical material having an index of refraction that is less than material of the light guide 110 (e.g., an optically clear adhesive). While not explicitly illustrated, a gap may also be employed between the reflective island 140 and other portions of the backlight scattering element 100 (e.g., the high-index light guide layer 120), in various embodiments including, but not limited to the ones described above.

FIGS. 3A-3D described above illustrate the high-index light guide layer 120 of the backlight scattering element 100 optically connected to the light guide 110 at or adjacent to the second surface 110" of the light guide 110 opposite to the first surface 110' through which the emitted light 102 is scattered by the diffraction grating 130. However, the high-index light guide layer 120 may be optically connected to the first surface 110', instead of the second surface 110", or even embedded within the light guide 110 itself, according to various other embodiments.

Figure 4A:
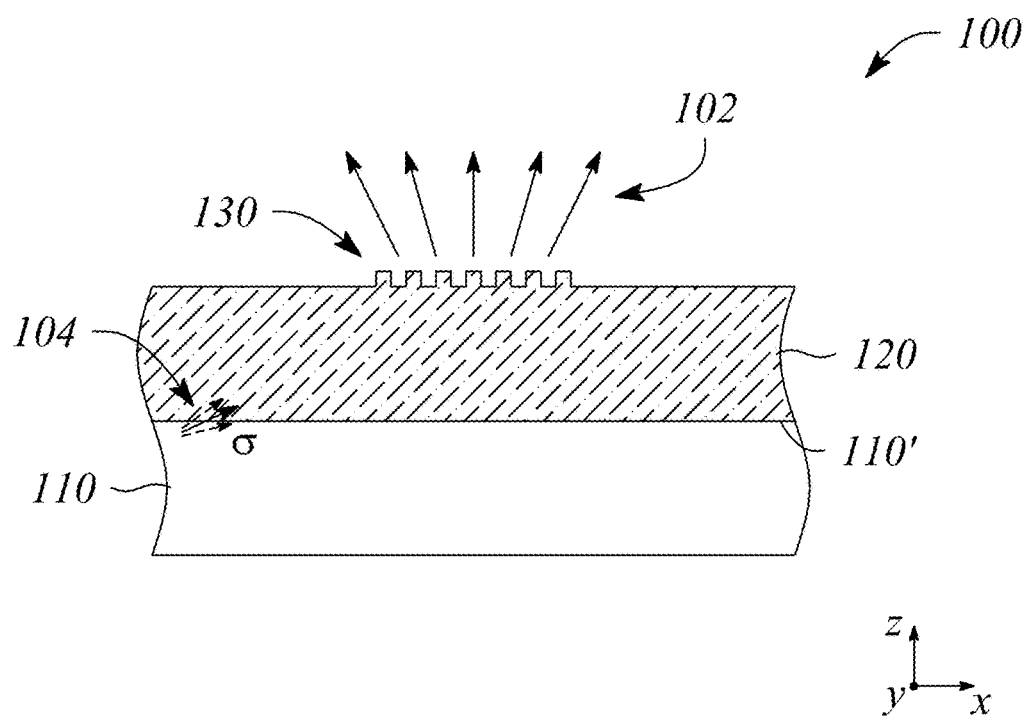
FIG. 4A illustrates a cross-sectional view of a backlight scattering element in an example, according to an embodiment consistent with the principles described herein.

FIG. 4A illustrates a cross sectional view of a backlight scattering element 100 in an example, according to an embodiment consistent with the principles described herein. In particular, FIG. 4A illustrates the backlight scattering element 100 comprising the light guide 110, the high-index light guide layer 120, diffraction grating 130, as previously described. However, as illustrated in FIG. 4A, the high-index light guide layer 120 is optically connected to the first surface 110' and the diffraction grating 130 is provided on a surface of the high-index light guide layer 120 opposite to the light guide 110. In FIG. 4A, the diffraction grating 130 may operate as a transmission mode diffraction grating to diffractively scatter out a portion of the guided light 104 as the emitted light 102.

Figure 4B:
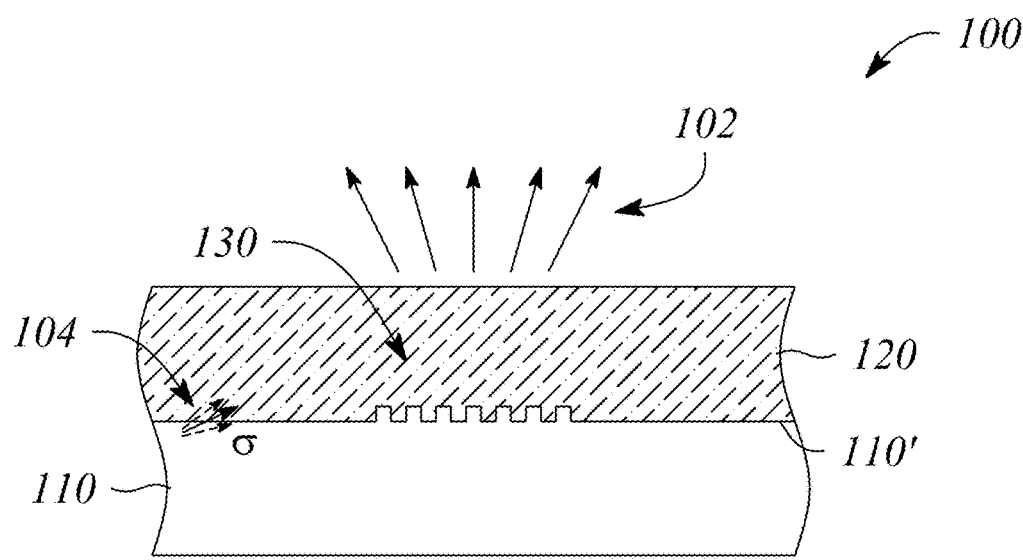
FIG. 4B illustrates a cross-sectional view of a backlight scattering element in an example, according to another embodiment consistent with the principles described herein.

FIG. 4B illustrates a cross sectional view of a backlight scattering element 100 in an example, according to another embodiment consistent with the principles described herein. In particular, FIG. 4B illustrates the backlight scattering element 100 comprising the light guide 110, the high-index light guide layer 120, diffraction grating 130, as previously described. As with FIG. 4A, in FIG. 4B the high-index light guide layer 120 is optically connected to the first surface 110' of the light guide 110. However, the diffraction grating 130 is provided between the light guide 110 and the high-index light guide layer 120, in this embodiment. Also as illustrated in FIG. 4B, the diffraction grating 130 may operate as a transmission mode diffraction grating to diffractively scatter out a portion of the guided light 104 through the high-index light guide layer 120 to provide the emitted light 102.

Figure 4C:
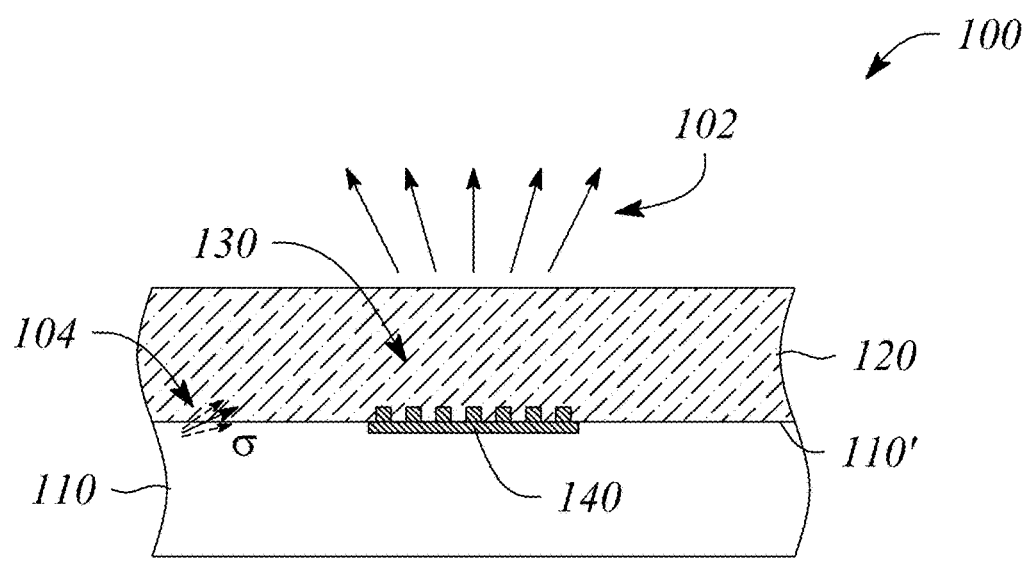
FIG. 4C illustrates a cross-sectional view of a backlight scattering element in an example, according to yet another embodiment consistent with the principles described herein.

FIG. 4C illustrates a cross sectional view of a backlight scattering element 100 in an example, according to yet another embodiment consistent with the principles described herein. In particular, FIG. 4C illustrates the backlight scattering element 100 comprising the light guide 110, the high-index light guide layer 120, diffraction grating 130, in an arrangement similar to that illustrated in FIG. 4B. The backlight scattering element 100 illustrated in FIG. 4C further comprises a reflective island 140 adjacent to the diffraction grating 130. The diffraction grating 130 and reflective island 140 may operate as a reflection mode diffraction grating to diffractively scatter out a portion of the guided light 104 through the high-index light guide layer 120 to provide the emitted light 102, as illustrated.

Figure 5:
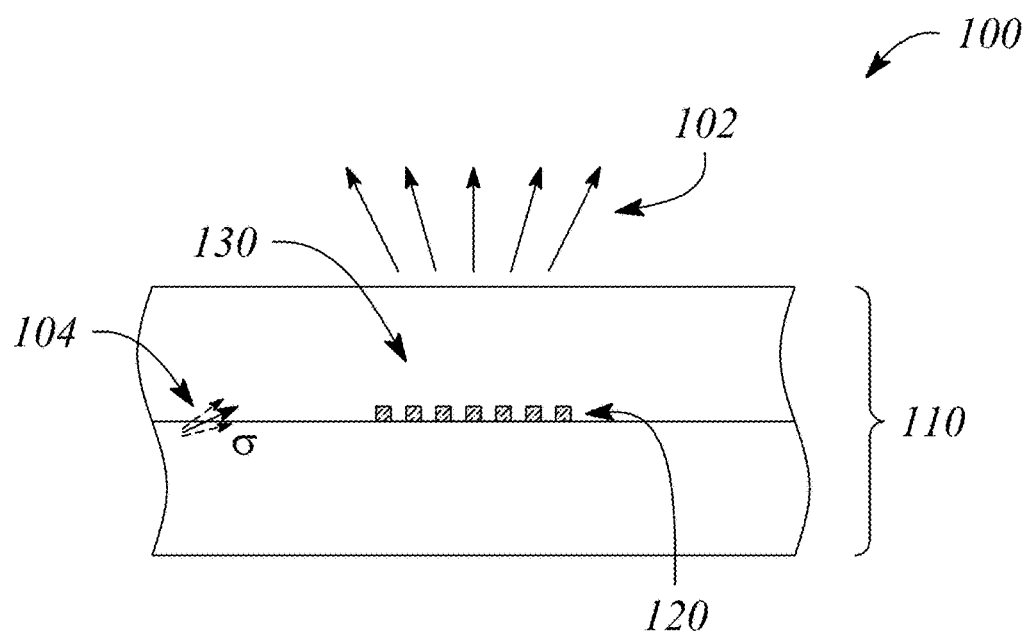
FIG. 5 illustrates a cross-sectional view of a backlight scattering element in an example, according to an embodiment consistent with the principles described herein.

FIG. 5 illustrates a cross sectional view of a backlight scattering element 100 in an example, according to an embodiment consistent with the principles described herein. In particular, FIG. 5 illustrates the backlight scattering element 100 comprising the light guide 110 and the diffraction grating 130, as described above. Further, as illustrated in FIG. 5, high-index light guide layer 120 is the diffraction grating 130 is embedded within light guide 110. In particular, the high-index light guide layer 120 is confined to diffractive features of the diffraction grating 130 (e.g., the diffractive features comprise material of the high-index light guide layer 120), as illustrated in FIG. 5 by way of example and not limitation. In some embodiments, the light guide 110 may be initially provided as two separate layers (e.g., indicated by a dashed line), the high-index light guide layer 120 may then be provided in the diffractive features of the diffraction grating 130, and the two separate layers may be connected (e.g., with an optical adhesive having an index of refraction that is matched to a refractive material of either the light guide 110 or the high-index light guide layer 120).

In some embodiments (not illustrated), backlight scattering element 100 of FIG. 5 may further comprise the reflective island 140 adjacent to the diffractive grating 130. With the reflective island 140, the diffraction grating 130 may operate as a reflection mode diffraction grating to diffractively scatter out the portion of the guided light 104 as the emitted light 102, while without the reflective island 140 the diffraction grating may operate as a transmission mode diffraction grating.

Note that while the high-index light guide layer 120 is illustrated in FIG. 5 as being confined to the diffractive features of the diffraction grating 130, alternatively the high-index light guide layer 120 may be a layer sandwiched between two portions or layers of the light guide 110, in some embodiments. Further, the diffraction grating 130 may be defined in or located at an interface between the high-index light guide layer 120 and either or both of the two layers of the light guide 110.

In some embodiments, the high-index light guide layer 120 may be or comprise a relatively thin layer of the high-index material. The thin layer may be configured to coat or fill diffractive features of the diffraction grating 130, in some embodiments. For example, the diffractive features may have a height of between about fifty nanometers (50 nm) and about two hundred nanometers (200 nm), while the relatively thin layer of the high-index light guide layer 120 may be less than the height of the diffractive features to provide conformal coating of filling. In another example, diffractive features of the diffraction grating 130 may be about one hundred nanometers (100 nm) to about five hundred nanometers (500 nm) with the relatively thin layer being less than the diffractive feature height. For example, the diffractive features may be about one hundred fifty nanometers (150 nm) and the high-index light guide layer 120 may be less than about 100-150 nm.

Figure 6:
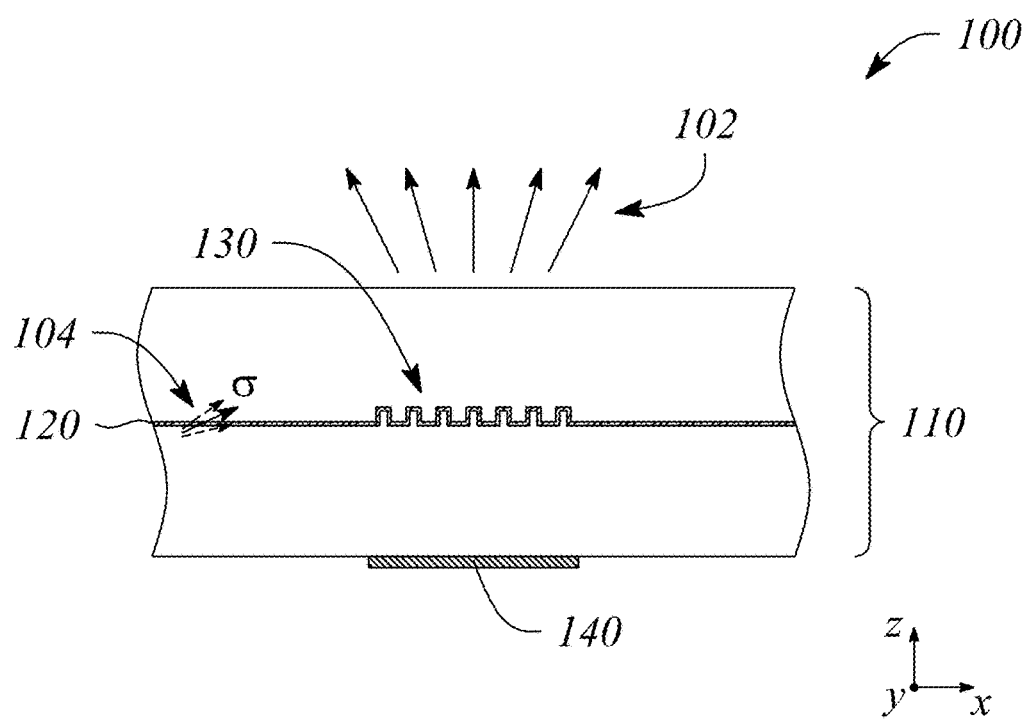
FIG. 6 illustrates a cross-sectional view of a backlight scattering element in an example, according to another embodiment consistent with the principles described herein.

FIG. 6 illustrates a cross sectional view of a backlight scattering element 100 in an example, according to another embodiment consistent with the principles described herein. As illustrated, the backlight scattering element 100 comprises the light guide 110, the high-index light guide layer 120, diffraction grating 130, and a reflective island 140, as previously described. However, the high-index light guide layer 120 is a relatively thin layer, as illustrated. In particular, the high-index light guide layer 120 is illustrated as being thin enough to conformally coat or fill diffractive features of the diffraction grating 130. For example, the relatively thin layer illustrated in FIG. 6 may be about 100 nm thick and the diffractive features of the diffraction grating 130 may be about 200 nm high. While the backlight scattering element 100 illustrated in FIG. 6 is within the light guide 110, the high-index light guide layer 120 comprising the relatively thin layer may be used to implement any of the embodiments described above with respect to at least FIGS. 3A-3C and 4A-4C, for example.

Figure 7A:
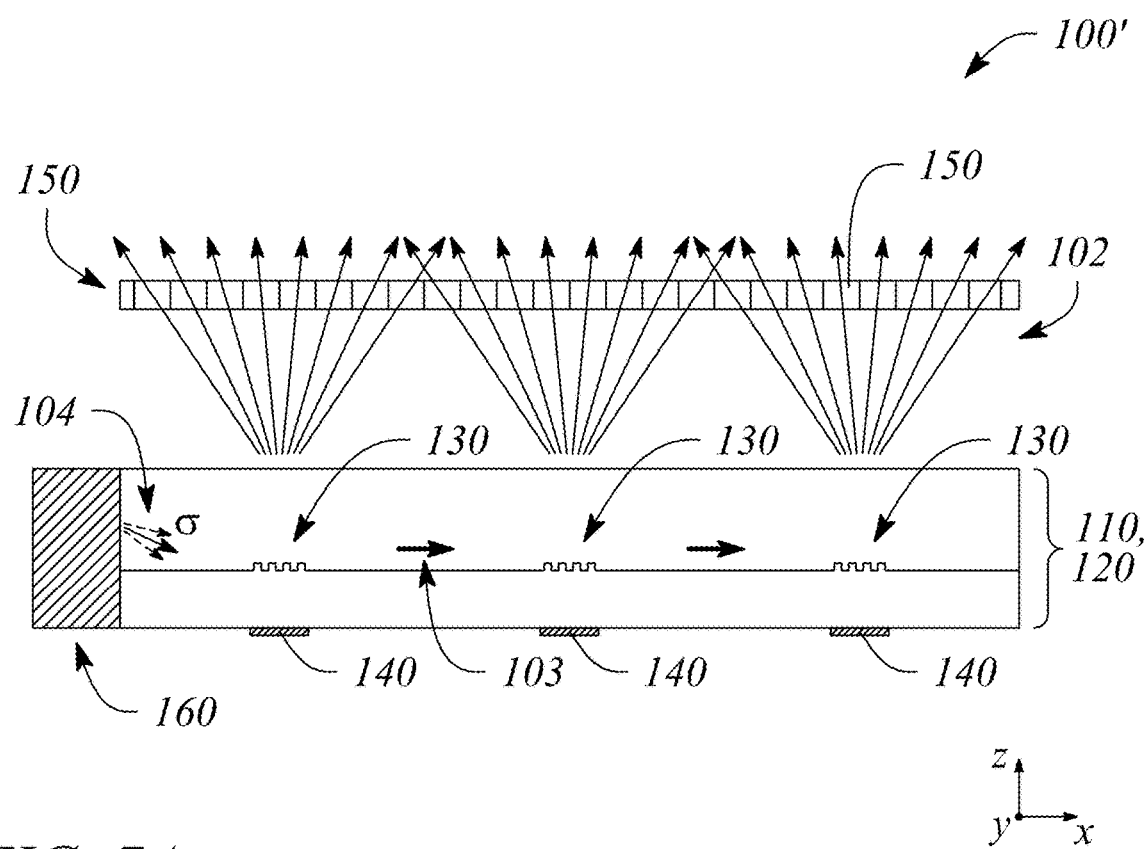
FIG. 7A illustrates a cross-sectional view of a multiview backlight in an example, according to an embodiment consistent with the principles described herein.
Figure 7B:
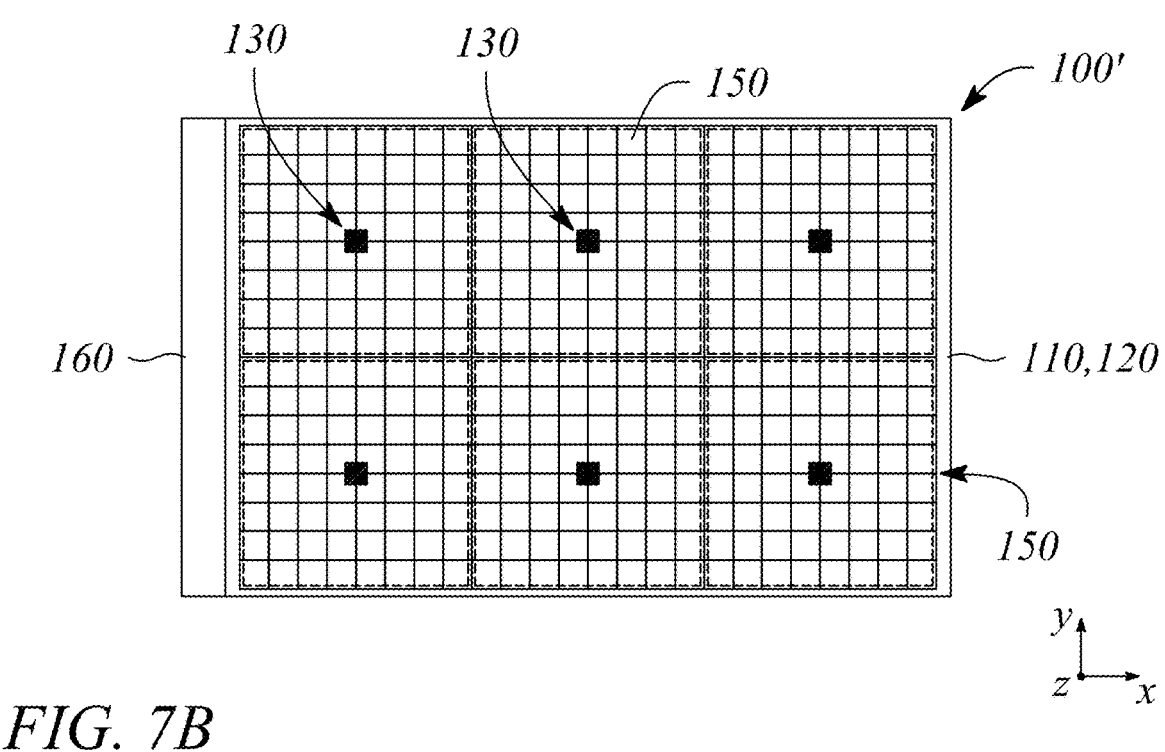
FIG. 7B illustrates a plan view of a multiview backlight in an example, according to an embodiment consistent with the principles described herein.
Figure 7C:
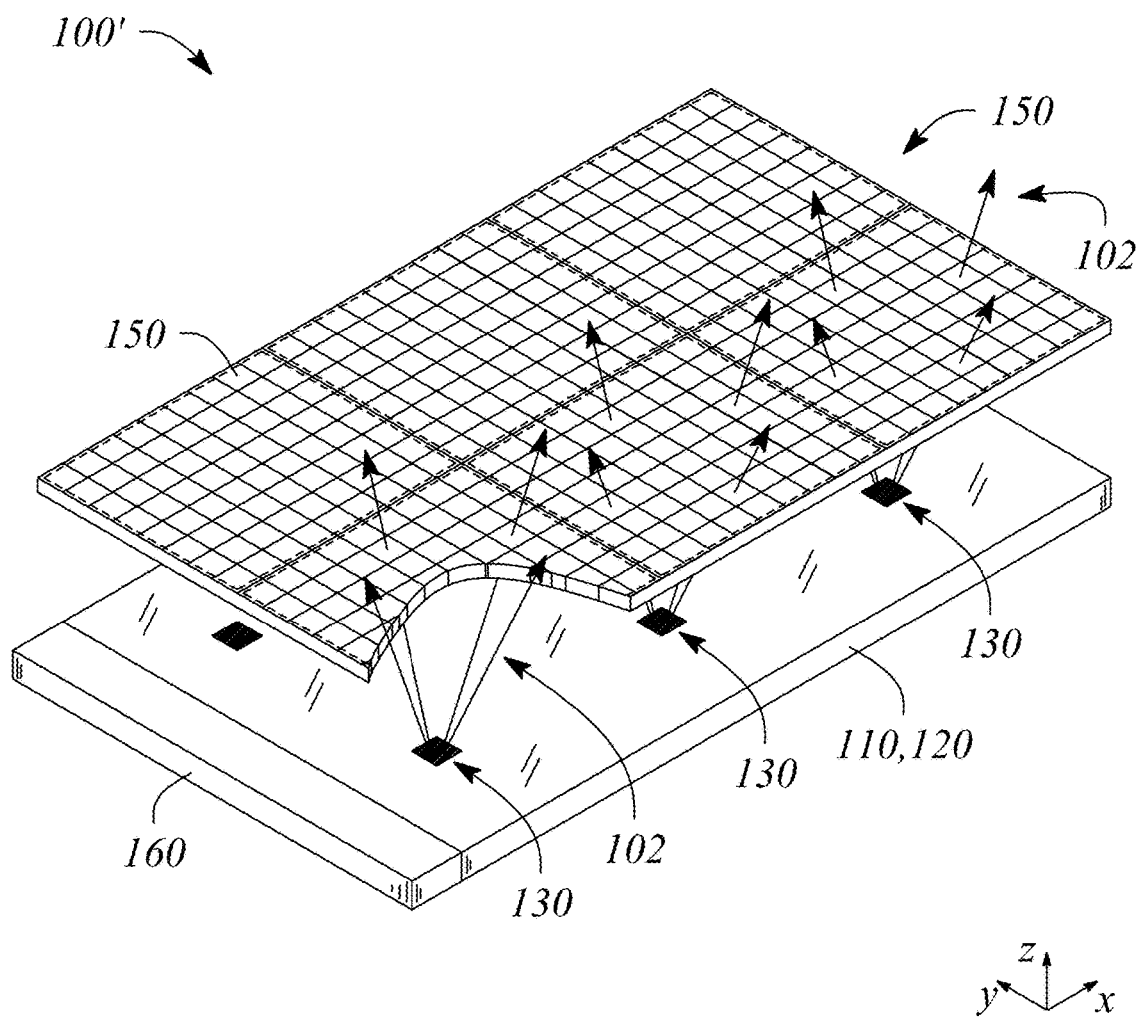
FIG. 7C illustrates a perspective view of a multiview backlight in an example, according to an embodiment consistent with the principles described herein.

According to some embodiments of the principles described herein, a multiview backlight comprising a backlight scattering element is provided. FIG. 7A illustrates a cross-sectional view of a multiview backlight 100' in an example, according to an embodiment consistent with the principles described herein. FIG. 7B illustrates a plan view of a multiview backlight 100' in an example, according to an embodiment consistent with the principles described herein. FIG. 7C illustrates a perspective view of a multiview backlight 100' in an example, according to an embodiment consistent with the principles described herein.

The multiview backlight 100' illustrated in FIGS. 7A-7C is configured to provide emitted light 102 as a plurality of directional light beams having different principal angular directions from one another (e.g., as a light field). In particular, the provided plurality of directional light beams of the emitted light 102 is diffractively scattered out and directed away from the multiview backlight 100' in different principal angular directions corresponding to respective view directions of different views of a multiview display that includes the multiview backlight 100', according to various embodiments. In some embodiments, the directional light beams of the emitted light 102 may be modulated (e.g., using light valves in the multiview display, as described below) to facilitate the display of information having multiview content, e.g., a multiview image. FIGS. 7A-7C also illustrate an array of light valves 150, which are described in further detail below.

As illustrated in FIGS. 7A-7C, the multiview backlight 100' comprises the backlight scattering element 100 including the light guide 110, the high-index light guide layer 120, and the diffraction grating 130. In some embodiments (e.g., as illustrated), the backlight scattering element 100 of the multiview backlight 100' further comprises the reflective island 140. As illustrated, the light guide 110 and high-index light guide layer 120 are configured to guide light along a length thereof as the guided light 104 (i.e., a guided light beam 104). According to some embodiments, the guided light 104 is guided using total internal reflection at a non-zero propagation angle and according to a collimation factor σ. A bold arrow depicting a propagation direction 103 illustrates a general propagation direction of the guided light 104 in FIG. 7A.

As illustrated in FIGS. 7A-7C, the diffraction grating 130 of the backlight scattering element 100 is configured as a multibeam element of an array of multibeam elements spaced apart from one another along a length of the light guide 110. Further, the diffraction grating 130 of each multibeam element of the multibeam element array is configured to diffractively scatter out the guided light portion as the emitted light 102 comprising a plurality of directional light beams having directions corresponding to view directions of a multiview display, according to various embodiments. FIGS. 7A and 7C illustrate the directional light beams of the emitted light 102 as a plurality of diverging arrows depicted as being directed way from an emitting surface of the light guide 110.

According to some embodiments, diffraction gratings 130 or more generally the multibeam elements of the multibeam element array may be arranged in either a one-dimensional (1D) array or a two-dimensional (2D) array. For example, the diffraction gratings 130 may be arranged as a linear 1D array. In another example, the diffraction gratings 130 may be arranged as a rectangular 2D array or as a circular 2D array (e.g., as illustrated in FIGS. 7B-7C). Further, the array (i.e., 1D or 2D array) may be a regular or uniform array, in some examples. In particular, an inter-grating distance (e.g., center-to-center distance or spacing) between the diffraction gratings 130 or equivalently between adjacent multibeam elements may be substantially uniform or constant across the multibeam element array. In other examples, the inter-grating distance between the diffraction gratings 130 may be varied one or both of across the multibeam element array.

According to some embodiments, a size of the multibeam element that includes the diffraction grating 130 is comparable to a size of a light valve 150 of the array of light valves 150. Herein, the 'size' may be defined in any of a variety of manners to include, but not be limited to, a length, a width or an area. For example, the size of a light valve 150 may be a length thereof and the comparable size of the multibeam element may also be a length of the multibeam element. In another example, the size may refer to an area such that an area of the multibeam element may be comparable to an area of the light valve 150.

In some embodiments, the size of the multibeam element is comparable to the light valve size such that the diffraction grating size is between about twenty-five percent (25%) and about two hundred percent (200%) of the light valve size. In other examples, the multibeam element size is in a range that is greater than about fifty percent (50%) of the light valve size, or greater than about sixty percent (60%) of the light valve size, or greater than about seventy percent (70%) of the light valve size, or greater than about eighty percent (80%) of the light valve size, and that is less than about one hundred eighty percent (180%) of the light valve size, or less than about one hundred sixty percent (160%) of the light valve size, or less than about one hundred forty (140%) of the light valve size, or less than about one hundred twenty percent (120%) of the light valve size. According to some embodiments, the comparable sizes of the diffraction grating 130 and the light valve 150 may be chosen to reduce, or in some examples to minimize, dark zones between views of the multiview display. Moreover, the comparable sizes of the multibeam element including the diffraction grating 130 and the light valve 150 may be chosen to reduce, and in some examples to minimize, an overlap between views (or view pixels) of a multiview display or of a multiview image displayed by the multiview display.

The multiview backlight 100' illustrated in FIGS. 7A-7C may be employed in a multiview display that further comprises the array of light valves 150 configured to modulate the directional light beams of the directional light beam plurality within the emitted light 102. As illustrated in FIGS. 7A-7C, different ones of the directional light beams (arrows) having different principal angular directions pass through and may be modulated by different ones of the light valves 150 in the light valve array. Further, as illustrated, a set of the light valves 150 corresponds to a multiview pixel of the multiview display, and a selected light valve 150 of the set corresponds to a view pixel. In particular, a different set of light valves 150 of the light valve array is configured to receive and modulate the directional light beams from a corresponding one of the multibeam elements comprising the diffraction gratings 130, i.e., there is one unique set of light valves 150 for each multibeam element having a diffraction grating 130 of the backlight scattering element 100, as illustrated. In various embodiments, different types of light valves may be employed as the light valves 150 of the light valve array including, but not limited to, one or more of liquid crystal light valves, electrophoretic light valves, and light valves based on electrowetting.

As mentioned above, the multiview backlight 100' may comprise the above-described backlight scattering element 100. As such, while illustrated in FIG. 7A in an arrangement that appears similar to that of FIG. 3A, the light guide 110, the high-index light guide layer 120, diffraction grating 130, and reflective island 140 of the multiview backlight 100' may arranged in substantially any of the configurations or according to any of the embodiments described above with respect to the backlight scattering element 100, e.g., with specific reference to FIGS. 3A-6.

Referring again to FIG. 7A, the multiview backlight 100' may further comprise a light source 160. According to various embodiments, the light source 160 is configured to provide the light to be guided within a combination of the light guide 110 and high-index light guide layer 120 of the backlight scattering element 100. In various embodiments, the light source 160 may comprise substantially any source of light (e.g., optical emitter) including, but not limited to, an LED, a laser (e.g., laser diode) or a combination thereof. In some embodiments, the light source 160 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 160 may be a substantially broadband light source configured to provide substantially broadband or polychromatic light. For example, the light source 160 may provide white light. In some embodiments, the light source 160 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 160 may further comprise a collimator. The collimator may be configured to receive substantially uncollimated light from one or more of the optical emitters of the light source 160. The collimator is further configured to convert the substantially uncollimated light into collimated light. In particular, the collimator may provide collimated light having the non-zero propagation angle and being collimated according to a predetermined collimation factor, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 110 to propagate as the guided light 104, described above.

Figure 8:
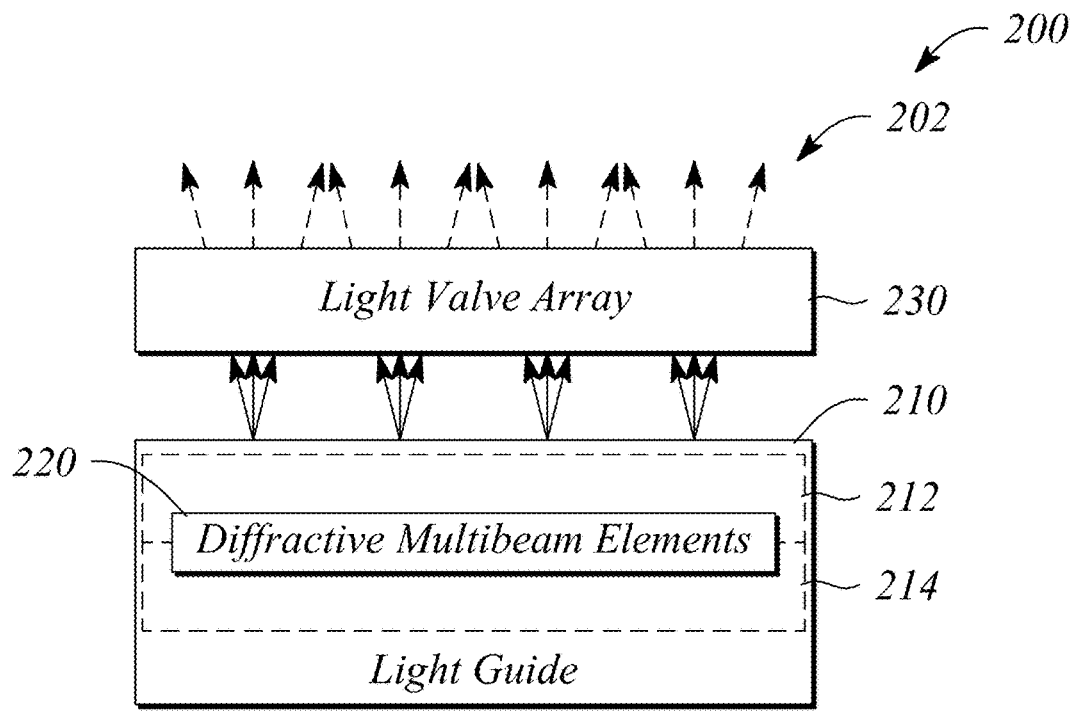
FIG. 8 illustrates a block diagram of a multiview display in an example, according to an embodiment consistent with the principles described herein.

In accordance with some embodiments of the principles described herein, a multiview display is provided. FIG. 8 illustrates a block diagram of a multiview display 200 in an example, according to an embodiment consistent with the principles described herein. As illustrated, the multiview display 200 is configured to emit a plurality of directional light beams 202 that may be modulated to provide a multiview image. In particular, modulated directional light beams 202 of the directional light beam plurality may represent view pixels in view directions of different views of the multiview image displayed by or on the multiview display 200, according to various embodiments.

As illustrated in FIG. 8, the multiview display 200 comprises a light guide 210. The light guide 210, in turn, comprises a first layer 212 and a second layer 214. A refractive index of the second layer 214 is greater than a refractive index of the first layer 212, according to various embodiments. In some embodiments, the first layer 212 may be substantially similar to the light guide 110 and the second layer 214 may be substantially similar to the high-index light guide layer 120 of the above-described backlight scattering element 100. In particular, the first and second layers 212, 214 of the light guide 210 may be arranged in any of the configurations or according to any of the embodiments described above with respect to the backlight scattering element 100, e.g., with specific reference to FIGS. 3A-6.

As illustrated in FIG. 8, the multiview display 200 further comprises array of multibeam elements 220 spaced apart from one another along the light guide 210. According to various embodiments, each multibeam element 220 of the multibeam element array comprises a diffraction grating adjacent to the second layer 214 of the light guide 210. As such, the multibeam elements 220 may be referred to as diffractive multibeam elements 220, in some embodiments. The diffraction grating of each of the multibeam elements 220 is configured to diffractively scatter out a portion of guided light from within the light guide 210 as a plurality of directional light beams 202 having directions corresponding to view directions of the multiview display 200 (or equivalently, view directions of a multiview image displayed by the multiview display 200). In some embodiments, the diffraction grating of the multibeam element 220 may be substantially similar to the diffraction grating 130, described above with respect to the backlight scattering element 100. As such, a combination of the light guide 210 and the multibeam element 220 may be substantially similar to the backlight scattering element 100, in some embodiments.

In particular, the diffraction grating of the multibeam element 220 may be located at an interface between the first and second layer 212, 214 of the light guide 210, in some embodiments. In other embodiments, the diffraction grating may be located away from the interface. For example, the diffraction grating of the multibeam element 220 may be located at a surface of the second layer 214 opposite to an interface between the first and second layers 212, 214, in some embodiments.

In some embodiments, the diffraction grating of a multibeam element 220 may comprise a pair of diffraction gratings. For example, the diffraction gratings of the multibeam element 220 may be located at or adjacent to an interface between the first and second layers 212, 214 and the multibeam element 220 may further comprises another diffraction grating located at a surface of the second layer 214 opposite to the interface between the first and second layers 212, 214. In some of these embodiments, the diffraction grating and the other diffraction grating of the multibeam element 220 may have a lateral offset or displacement from or with respect to one another. The lateral offset may be configured to optimize a diffractive scattering efficiency of the multibeam element 220, according to some of these embodiments, as described above.

The multiview display 200 illustrated in FIG. 8 further comprises an array of light valves 230. The array of light valves 230 is configured to modulate directional light beams 202 of the directional light beam plurality to provide a multiview image. In some embodiments, the array of light valves 230 may be substantially similar to the array of light valves 150, described above with respect to the multiview backlight 100'. In particular, light valves 230 of the array of light valves 230 may arranged in groups or sets representing a multiview pixel and being associated with individual ones of the multibeam elements 220 (e.g., as illustrated in FIGS. 7A-7C), in some embodiments.

According to some embodiments (not illustrated), the multibeam element 220 may further comprise a reflective island. In particular, the reflective island may be aligned with and have a size corresponding to the diffraction grating of the multibeam element. According to various embodiments, the reflective island comprises a reflective material configured to reflectively redirect light scattered by the diffraction gratings in a direction corresponding to a direction of the directional light beam plurality. The reflective island may be substantially similar to the reflective island 140 of the above-described backlight scattering element 100, in some embodiments. For example, diffractive features of the diffraction grating of the multibeam element 220 may comprise the reflective material of the reflective island, in some embodiments.

The multiview display 200 may further comprise a light source (not illustrated) configured to provide light to the light guide 210 as the guided light. The light source may be coupled to an input end or surface of the light guide 210, for example. In some embodiments, the light source may be substantially similar to the light source 160, described above with respect to the backlight scattering element 100. For example, the light source 160 may be configured to provide light as the guided light one or both of at a non-zero propagation angle and according to a predetermined collimation factor σ.

Figure 9:
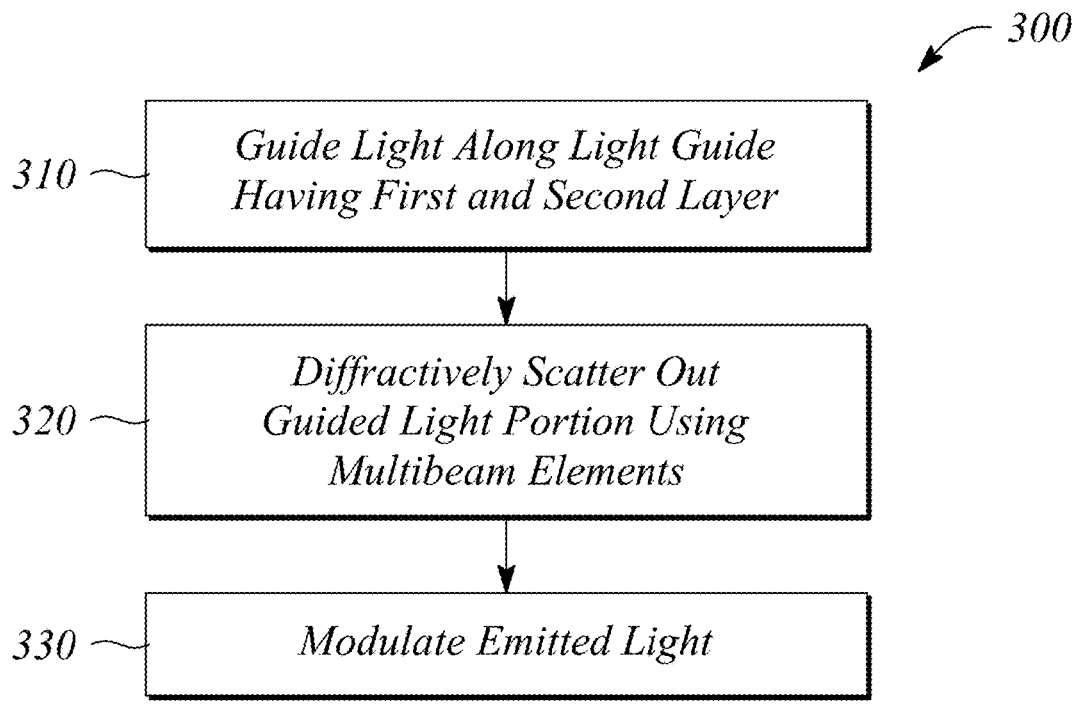
FIG. 9 illustrates a flow chart of a method of multiview backlight operation in an example, according to an embodiment consistent with the principles described herein.

In accordance with other embodiments of the principles described herein, a method of backlight scattering element operation is provided. FIG. 9 illustrates a flow chart of a method 300 of backlight scattering element operation in an example, according to an embodiment consistent with the principles described herein. As illustrated in FIG. 9, the method 300 of backlight scattering element operation comprises guiding 310 the light in a light guide as guided light. The light guide used in guiding 310 comprises a first layer and a second layer. The second layer comprises a material having a refractive index that is greater than a refractive index of a material of the first layer of the light guide. According to some embodiments, the light guide may be substantially similar to the light guide 210 described above with respect to the multiview display 200 or to a combination of the light guide 110 and the high-index light guide layer 120 of the above-described backlight scattering element 100. As such, the light is guided 310 as guided light within the light guide according to total internal reflection. In some embodiments, the light may be guided at a non-zero propagation angle. Also, the guided light may be collimated according to a predetermined collimation factor σ, in some embodiments.

As illustrated in FIG. 9, the method 300 of backlight scattering element operation further comprises diffractively scattering 320 out a portion of the guided light from the light guide as emitted light using a diffraction grating located adjacent to the second layer of the light guide. In some embodiments, the diffraction grating used in diffractively scattering 320 out a portion of the guided light may be substantially similar to the diffraction grating 130 described above with respect to the backlight scattering element 100.

In some embodiments (not illustrated), the backlight scattering element operation may comprise reflecting light diffractively scattered by the diffraction grating in a direction of the emitted light using a reflective island aligned with and having an extent corresponding to an extent of the diffraction grating. In some embodiments, the reflective island may be substantially similar to the reflective island 140, of the above-described backlight scattering element 100. In some embodiments, the diffraction grating and reflective island, in combination, represent a reflection mode diffraction grating.

In some embodiments (not illustrated), the diffraction grating may be configured as a multibeam element of an array of multibeam elements spaced apart from one another along a length of the light guide. The diffraction grating of each multibeam element of the multibeam element array may diffractively scattering 320 out the guided light portion as the emitted light comprising a plurality of directional light beams having directions corresponding to view directions of a multiview display. In some embodiments, the multibeam element comprising the diffraction grating may substantially similar to the multibeam element 220, described above with respect to the multiview display 200.

In some embodiments (e.g., as illustrated in FIG. 9), the method 300 of backlight scattering element operation further comprises modulating 330 the emitted light to display one or both of a two-dimensional (2D) image or a multiview image using an array of light valves. According to some embodiments, the plurality of light valves may be substantially similar to the array of light valves 150 described above with respect to the multiview display 200.

In some embodiments (not illustrated), the method of backlight scattering element operation further comprises providing light to the light guide using a light source. The provided light one or both of may have a non-zero propagation angle within the light guide. Further, the guided light may be collimated, e.g., collimated according to a predetermined collimation factor σ. According to some embodiments, the light source may be substantially similar to the light source 160 described above with respect to the backlight scattering element 100 or multiview backlight 100'.

Thus, there have been described examples and embodiments of a backlight scattering element, a multiview display, and a method of backlight scattering element operation that employ a diffraction grating adjacent to a light guide layer having a refractive index that is greater than a refractive index of another light guide layer to diffractively scatter out light as emitted light. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A backlight scattering element comprising:
a light guide configured to guide light as guided light;
a high-index light guide layer optically connected to a surface of the light guide and configured to extend a thickness of the light guide, a refractive index of a material of the high-index light guide layer being greater than a refractive index of a material of the light guide;
a diffraction grating adjacent to the high-index light guide layer, the diffraction grating being configured to diffractively scatter out a portion of the guided light as emitted light; and
a reflective island aligned with and having an extent corresponding to an extent of the diffraction grating, the reflective island being configured to reflect light diffractively scattered by the diffraction grating in a direction corresponding to a direction of the emitted light, wherein the diffraction grating and the reflective island, in combination, represent a reflection mode diffraction grating.

2. The backlight scattering element of claim 1, wherein the high-index light guide layer is between the reflective island and the light guide, the diffraction grating being located one or both of (a) at an interface between the high-index light guide layer and the light guide, and (b) between the high-index light guide layer and the reflective island.

3. The backlight scattering element of claim 1, wherein the diffraction grating comprises a first diffraction grating located at an interface between the high-index light guide layer and the light guide, and a second diffraction grating located at a surface of the high-index light guide layer opposite to the interface.

4. The backlight scattering element of claim 3, wherein the first diffraction grating has a lateral offset from the second diffraction grating, the lateral offset being greater than a spacing between diffractive features of the first and second diffraction gratings.

5. The backlight scattering element of claim 3, further comprising a reflective island adjacent to the second diffraction grating at the high-index light guide layer surface.

6. The backlight scattering element of claim 1, wherein the high-index light guide layer is adjacent to a surface of light guide through which the guided light portion is diffractively scattered as the emitted light.

7. The backlight scattering element of claim 1, wherein the guided light within the light guide is one or both collimated according to a collimation factor and is configured to propagate at a non-zero propagation angle relative a guiding surface of the light guide.

8. A multiview backlight comprising the backlight scattering element of claim 1, wherein the diffraction grating is configured as a multibeam element of an array of multibeam elements spaced apart from one another along a length of the light guide, each multibeam element of the multibeam element array being configured to diffractively scatter out the guided light portion as the emitted light comprising a plurality of directional light beams having directions corresponding to view directions of a multiview display.

9. A multiview display comprising the multiview backlight of claim 8, the multiview display further comprising an array of light valves configured to modulate directional light beams of the directional light beam plurality as a multiview image, a size of the multibeam element being between one half and two times a size of a light valve of the light valve array.

10. A multiview display comprising:
a light guide comprising a first layer and a second layer, a refractive index of the second layer being greater than a refractive index of the first layer;
an array of multibeam elements spaced apart from one another along the light guide, each multibeam element of the multibeam element array comprising a diffraction grating adjacent to the second layer of the light guide and being configured to diffractively scatter out a portion of guided light from within the light guide as a plurality of directional light beams having directions corresponding to view directions of the multi view display; and
an array of light valves configured to modulate directional light beams of the directional light beam plurality to provide a multiview image.

11. The multiview display of claim 10, wherein the diffraction grating of the multibeam element is located at an interface between the first and second layers.

12. The multiview display of claim 10, wherein the diffraction grating of the multibeam element is located at a surface of the second layer opposite to an interface between the first and second layers.

13. The multiview display of claim 10, wherein the diffraction grating of a multibeam element of the multibeam element array is located at an interface between the first and second layers, the multibeam element further comprising another diffraction grating located at a surface of the second layer opposite to the interface between the first and second layers.

14. The multiview display of claim 13, wherein the diffraction grating and the other diffraction grating of the multibeam element have a lateral offset from one another, the lateral offset being configured to optimize a diffractive scattering efficiency of the multibeam element.

15. The multiview display of claim 14, wherein the multibeam element further comprises a reflective island aligned with and having a size corresponding to the diffraction grating, the reflective island comprising a reflective material configured to reflectively redirect light scattered by the diffraction gratings in a direction corresponding to a direction of the directional light beam plurality.

16. The multiview display of claim 15, wherein diffractive features of the diffraction grating of the multibeam element comprise the reflective material of the reflective island.

17. A method of backlight scattering element operation, the method comprising:
guiding light in a light guide as guided light, the light guide comprising a first layer and a second layer; and diffractively scattering out a portion of the guided light from the light guide as emitted light using a diffraction grating located adjacent to the second layer of the light guide, wherein the second layer comprises a material having a refractive index that is greater than a refractive index of a material of the first layer of the light guide.

18. The method of backlight scattering element operation of claim 17, further comprising reflecting light diffractively scattered by the diffraction grating in a direction of the emitted light using a reflective island aligned with and having an extent corresponding to an extent of the diffraction grating, wherein the diffraction grating and reflective island, in combination, represent a reflection mode diffraction grating.

19. The method of backlight scattering element operation of claim 17, wherein the diffraction grating is configured as a multibeam element of an array of multibeam elements spaced apart from one another along a length of the light guide, each multibeam element of the multibeam element array diffractively scattering out the guided light portion as the emitted light comprising a plurality of directional light beams having directions corresponding to view directions of a multiview display.

* * * * *